(12) United States Patent
Osada et al.

(10) Patent No.: US 8,188,212 B2
(45) Date of Patent: May 29, 2012

(54) METHOD OF ENHANCING CONDUCTIVITY OF CONDUCTIVE POLYMER PRODUCT

(75) Inventors: Fumio Osada, Higashimurayama (JP); Shinya Fukuzawa, Higashimurayama (JP); Kazuyo Nagai, Higashimurayama (JP)

(73) Assignee: Nikkiso Co., Ltd., Tokyo (JP)

( * ) Notice: Subject to any disclaimer, the term of this patent is extended or adjusted under 35 U.S.C. 154(b) by 0 days.

(21) Appl. No.: 12/920,989

(22) PCT Filed: Mar. 11, 2008

(86) PCT No.: PCT/JP2008/000533
§ 371 (c)(1),
(2), (4) Date: Nov. 24, 2010

(87) PCT Pub. No.: WO2009/113125
PCT Pub. Date: Sep. 17, 2009

(65) Prior Publication Data
US 2011/0071265 A1    Mar. 24, 2011

(30) Foreign Application Priority Data

Mar. 10, 2008  (JP) ................................. 2008-060106

(51) Int. Cl.
*C08F 6/00* (2006.01)
*C08G 63/02* (2006.01)

(52) U.S. Cl. ..... 528/492; 252/500; 252/511; 428/317.9; 526/256; 528/271; 528/272

(58) Field of Classification Search .................. 252/500, 252/511; 428/317.9; 526/256
See application file for complete search history.

(56) References Cited

U.S. PATENT DOCUMENTS

| | | | |
|---|---|---|---|
| 6,156,235 A | 12/2000 | Bessette et al. | |
| 2003/0144465 A1 | 7/2003 | Leenders et al. | |
| 2004/0254297 A1 | 12/2004 | Hsu et al. | |
| 2005/0007430 A1* | 1/2005 | Rowe et al. | 347/95 |
| 2005/0029117 A1 | 2/2005 | Mabrouk | |
| 2005/0208328 A1 | 9/2005 | Hsu et al. | |
| 2006/0236531 A1 | 10/2006 | Merker et al. | |

FOREIGN PATENT DOCUMENTS

| | | |
|---|---|---|
| EP | 2 158 975 A1 | 3/2010 |
| JP | 2003138142 A | 5/2003 |
| JP | 2005511809 A | 4/2005 |
| JP | 2006111798 A | 4/2006 |
| JP | 2006527277 A | 11/2006 |
| JP | 2007529608 A | 10/2007 |
| RU | 2006111714 A | 11/2007 |
| WO | 98/43250 A1 | 10/1998 |
| WO | 2004/091571 A2 | 10/2004 |
| WO | 2005/071696 A1 | 8/2005 |
| WO | 2005090434 A1 | 9/2005 |
| WO | 2006057374 A1 | 6/2006 |
| WO | 2007031207 A1 | 3/2007 |

OTHER PUBLICATIONS

Information on conductive polymer products "Baytron" in the website of Junsei Chemical Co., Ltd., http://www.junsei.co.jp/Baytron_fig1.html (accessed Feb. 12, 2008).

Information on conductive polymer products "Baytron (PEDOT)" in the website of TA Chemical Co., Ltd., http://www.ta-chemi.co.jp/PEDOT.html (accessed Feb. 12, 2008).

A brief entitled "Development and Adaptation of Baytron, and PEDOT" by Joji Hashimoto, http://www.kanagawa-iri.go.jp/kitri/kouhou/program/H17/pdf171019/1204.pdf (accessed Feb. 12, 2008).

A brief entitled "Development and Adaptation of Baytron, or PEDOT" by George Hashimoto, http://www.kanagawa-iri.go.jp/kitri/kouhou/program/H17/pdf171019/1204.pdf (accessed Feb. 12, 2008).

* cited by examiner

*Primary Examiner* — Terressa Boykin
(74) *Attorney, Agent, or Firm* — The Webb Law Firm

(57) ABSTRACT

A method of enhancing the conductivity of various conductive polymer products, such as a conductive polymer product obtained by polymerizing 3,4-ethylenedioxythiophene in an aqueous solution of polystyrenesulfonic acid. The method of enhancing the conductivity of a conductive polymer product includes placing a conductive polymer product, water, an organic solvent compatible with the conductive polymer product, and carbon dioxide gas in a pressure vessel; and applying heat and pressure to an interior of the pressure vessel to bring the carbon dioxide into a supercritical state.

8 Claims, 2 Drawing Sheets

METHOD OF ENHANCING CONDUCTIVITY OF CONDUCTIVE POLYMER PRODUCT

TECHNICAL FIELD

The present invention relates to a method of enhancing the conductivity of a conductive polymer product, more particularly to a method of further enhancing the conductivity of a conductive polymer product obtained by polymerizing 3,4-ethylenedioxythiophene in an aqueous solution of polystyrenesulfonic acid.

BACKGROUND ART

Polymerization of 3,4-ethylenedioxythiophene in an aqueous solution of polystyrenesulfonic acid provides a conductive polymer product which is a mixture of polystyrene sulfonic acid and poly(3,40ethylenedioxythiophene).

This type of conductive polymer products is sold as Baytron, a registered trademark (See non-patent documents 1 and 2). Among these conductive polymer products, a product sold as Baytron P, "Baytron" of which is a registered trademark, has a conductivity of 1 S/cm. It is known that this product with a 5% DMSO added has an enhanced conductivity of 80 S/cm (See non-patent documents 1 and 2).

This type of conductive polymer products is considered to become a replacement for ITO (See non-patent document 3). However, in order to have the market recognize these compositions as a replacement for ITO, it is desirable that they have more excellent properties than ITO. In other words, a new technology to further enhance the conductivity of these conductive polymer products is desired.

Non-patent document 1: Information on conductive polymer products "Baytron" in the website of Junsei Chemical Co., Ltd. searched on Feb. 12, 2008 (URL: http://www.junsei.co.jp/Baytron_fig1.html)

Non-patent document 2: Information on conductive polymer products "Baytron (PEDOT)" in the website of TA Chemical CO., LTD. searched on Feb. 12, 2008 (URL: http://www.ta-chemi.co.jp/PEDOT.html)

Non-patent document 3: A Brief entitled "Development and Adaptation of Baytron (Registered Trademark), or PEDOT (polyethylenedioxythiophene)" by George Hashimoto, searched on Feb. 12, 2008 (URL: http://www.kanagawa-iri.go.jp/kitri/kouhou/program/H17/pdf171019/1204.pdf)

DISCLOSURE OF THE INVENTION

Problems to be Solved by the Invention

An objective of the present invention is to provide a method of further enhancing the conductivity of various conductive polymer products including a conductive polymer product prepared through polymerization of 3,4-ethylenedioxythiophene in an aqueous solution of polystyrenesulfonic acid.

Means to Solve the Problems

In order to achieve the objective written above, the present invention provides the following means:

The first means is a method of enhancing a conductivity of a conductive polymer product comprising placing a conductive polymer product, water, an organic solvent compatible with the conductive polymer product, and carbon dioxide gas in a pressure vessel; and applying heat and pressure to an interior of the pressure vessel to bring the carbon dioxide into a supercritical state.

The second means is the method of enhancing a conductivity of a conductive polymer product according to the first means, wherein the conductive polymer product is a product obtained by polymerizing 3,4-ethylenedioxythiophene in an aqueous solution of polystyrenesulfonic acid and/or polyaniline.

The third means is the method of enhancing a conductivity of a conductive polymer product according to the first or second means, wherein the organic solvent is at least one selected from the group consisting of dimethyl sulfoxide, ethylene glycol, N-methylpyrrolidone and N,N-dimethylformamide.

The fourth means is the method of enhancing a conductivity of a conductive polymer product according to any one of the first to third means, wherein the interior of the pressure vessel is pressurized to a pressure from 7 to 25 MPa and heated to a temperature from 85 to 110° C., and the pressure and the temperature are maintained for 0.5 to 4 hours.

Advantages of the Invention

The present invention is capable of providing a method of further enhancing a conductivity of conductive polymer products themselves including a polymer product obtained by polymerizing 3,4-ethylenedioxythiophene in an aqueous solution of polystyrenesulfonic acid, and/or polyaniline.

Figure 1:
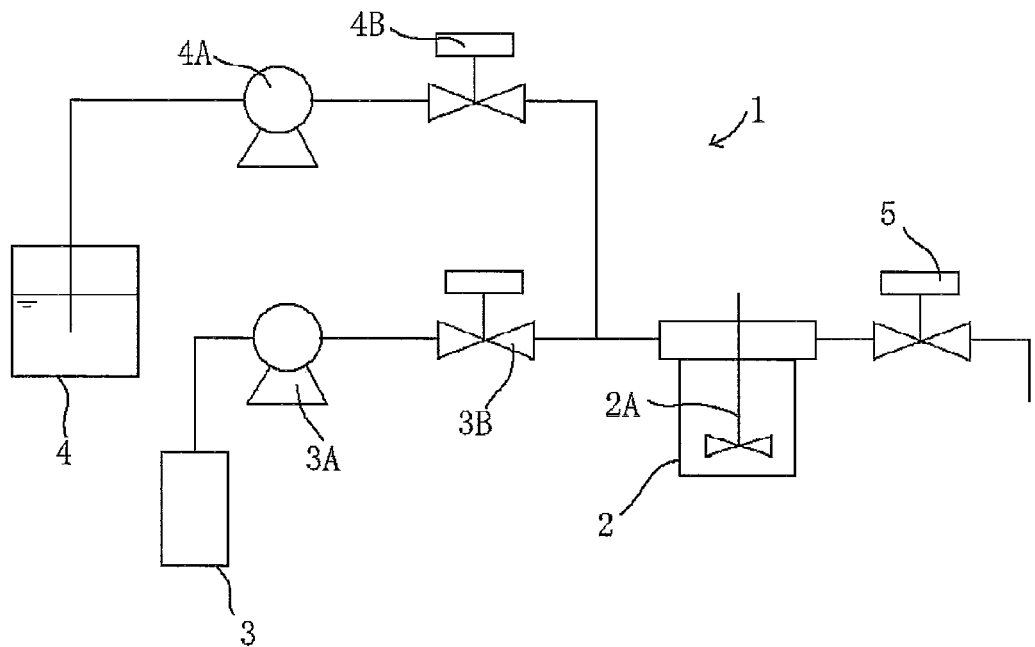
FIG. 1 is a schematic illustration of an apparatus for enhancing conductivity according to the present invention.

EXPLANATION OF REFERENCE NUMERALS 1 apparatus for enhancing conductivity
2 pressure vessel
2A stirrer
3 carbon dioxide cylinder
3A first pump
3B first valve
4 water tank
4A second pump
4B second valve
5 third valve
6 second pressure vessel
7 fourth valve
8 coil reactor

BEST MODE TO CARRY OUT THE INVENTION

The method of enhancing conductivity according to the present invention includes a step of placing in a pressure vessel a conductive polymer product, especially one obtained by polymerizing-3,4-ethylenedioxythiophene in an aqueous solution of polystyrenesulfonic acid, and/or polyaniline; water; an organic solvent compatible with the conductive polymer product; and carbon dioxide gas, which is followed by a step of applying heat and pressure to the interior of the pressure vessel to bring the carbon dioxide gas into a supercritical state.

The conductive polymer product includes polystyrenesulfonic acid and poly(3,4-ethylenedioxythiophene). This conductive polymer product is not merely a blend of polystyrenesulfonic acid and poly(3,4-ethylenedioxythiophene). The product is considered to have a structure where poly(3,4-ethylenedioxythiophene) is coordinated by —$SO_3^-$ moieties of polystyrenesulfonic acid.

This type of conductive polymer products is sold as Baytron, which is a product name. Examples of the conductive polymer products capable of being used for the method of the present invention may include Baytron® P, Baytron® PAG, Baytron® PH, Baytron® PTP, Baytron® PLS, Baytron® PHS and Baytron® PHCV4. In addition to these products may be used general conductive polymers such as polyacetylene, poly(p-phenylene), poly(phenylene vinylene), polypyrrole, poly(3-methylthiophene), polyaniline, polythiophene, poly(thienylene vinylene), polyfluorene, and polyacene. These conductive polymers after a treatment by the method of enhancing conductivity according to the present invention have a smaller particle size than the polymers before the treatment. Although a sure theoretical base has not been established, it is supposed that the smaller particle size of the conductive polymer products shortens the path along which electrons move, whereby conduction is caused, in conduction within a molecular chain, conduction between molecular chains and conduction between particles.

Examples of the water to be mixed with the conductive polymer product may include ion-exchanged water and extrapure water.

The proportion of water to the conductive polymer product in the pressure vessel is generally from 50 to 10000 parts by mass, preferably from 20 to 2000 parts by mass, to the part by mass of the conductive polymer product. When the amount of water exceeds the range, the conductive polymer product may float on or in the water at a level corresponding to an upper part of the vessel, which does not let the reaction take place. On the other hand, when the amount of water is too small, the reaction may not proceed sufficiently. The use of water in an amount less than the range suffers from another disadvantage: A dispersing and atomizing operation takes moisture from the conductive polymer product and turns it dry, which makes it shrivel. The use of water in an amount more than the range also has another disadvantage: The concentration of the treated product dispersed in water is very small, which makes it impossible to use the dispersion as it is and requires adjustment of the concentration of the dispersion.

A Baytron itself is a water dispersion including a conductive polymer product in an amount from 1 to 1.3% by mass. Therefore when a Baytron is used as conductive polymer product, the proportion of water to a Baytron may be generally from 0.5 to 3 parts by volume, preferably from 1 to 2 parts by volume, to the part by volume of the Baytron.

Preferable examples of the organic solvent compatible with the conductive polymer product may include ethylene glycol, N,N-dimethylformamide, dimethyl sulfoxide, and N-methylpyrrolidone.

The amount of the organic solvent should be decided so that the proportion of the organic solvent to a mixture of water and the conductive polymer product is generally from 1 to 10% by mass, preferably from 3 to 6% by mass. When the amount of the organic solvent is less than the range, an improvement in conductivity cannot be expected. On the other hand, when the amount of the solvent exceeds the range, the treated product being applied to an intended use may fall under the influence of an excessive amount of additives and may be incapable of forming a film. Another example of the influence is that when an article is coated with the treated product, a film of the product may become uneven or smooth coating of the article may not be carried out.

The proportion of carbon dioxide to water in the pressure vessel is normally from 80 to 500 grams of carbon dioxide, preferably from 95 to 400 grams thereof, to 10 ml of water.

The method of this invention requires introducing carbon dioxide, water, the conductive polymer product and the organic solvent into a pressure vessel. There is no limitation on the order of introducing carbon dioxide, water, the conductive polymer product and the organic solvent into the pressure vessel. It may be acceptable if the conductive polymer product, the organic solvent and water are mixed prior to the introduction of them into the pressure vessel and afterward the resultant mixture is placed in the pressure vessel.

In many cases, water, the conductive polymer product and the organic solvent are placed in a pressure vessel first. Subsequently carbon dioxide gas is injected into the pressure vessel. Then, the conditions inside the pressure vessel are turned to those which bring carbon dioxide into a supercritical state. Specifically, the interior of the pressure vessel is kept at a pressure normally from 7 to 25 MPa, preferably from 9 to 15 MPa, and a temperature normally from 85 to 110° C., preferably from 95 to 105° C. Also, the time period to keep carbon dioxide in the pressure vessel in a supercritical state is normally from 0.5 to 3 hours, preferably from 1 to 2 hours. There is no special limitation on the shape of the pressure vessel as long as carbon dioxide is capable of being brought into a supercritical state in the vessel. The pressure vessel may be in the shape of, for example, a tank or a tube such as a straight tube and a hose.

In the method of the present invention, after keeping the carbon dioxide inside the pressure vessel in a supercritical state, the pressure inside the vessel is returned to normal pressure. In ordinary cases, the carbon dioxide in the pressure vessel is then released to the atmosphere. A mixture of the water, the conductive polymer product and the organic solvent thus remains in the pressure vessel. The mixture may be used as it is in some applications. On the other hand in other applications that require use of the isolated conductive polymer product, the product may be separated from the remaining by an ordinary separator such as a filter.

When a pretreated conductive polymer product, prior to the introduction into a pressure vessel, has a shape of large dimensions, such as lumps, fragments, granules or grains, the method of the present invention turns the pretreated conductive polymer product to an inventive conductive polymer product in the shape of small particles. The resultant product has an average particle size from 0.02 to 0.05 μm. The average particle size of an obtained product may be measured with a particle size distribution analyzer, such as a "Microtrac", a product of Nikkiso Co., Ltd.

When a conductive polymer product to which the method of the present invention is applied is a mixture of polystyrenesulfonic acid and poly(3,4-ethylenedioxythiophene), the conductive polymer product swells with water to form a water-swollen polymer product, which is made possible by the fact that the molecules of the polystyrenesulfonic acid, included in the conductive polymer product, have —$SO_3^-$ groups capable of forming electrovalent bonds with the poly(3,4-ethylenedioxythiophene). This water-swollen polymer product has ionic functional groups —$SO_3^-$ in the molecules thereof, which are capable of bonding with water molecules, thereby we think swelling the polymers with water. When this conductive polymer product is placed in a pressure vessel and the method according to the present invention is applied to the product, i.e. carbon dioxide is brought into a supercritical state in the presence of water and the conductive polymer product, the supercritical carbon dioxide has a density close to a density of the gas while keeping the properties of liquid, which brings the supercritical carbon dioxide into a state in which it easily permeates into polymers. When the carbon dioxide permeates into and passes through the polymer molecules, water molecules penetrate into the polymer molecules together with the carbon dioxide. Thereafter, the pressure in the pressure vessel is returned to normal pressure, which results in the situations where the carbon dioxide vaporizes in a moment and the volume of the water increases. The water with an increased volume remaining in the polymer molecules after the carbon dioxide in the form of gas escapes from the molecules cuts principal chains of the polymers to form a conductive polymer product in the shape of fine particles. It is supposed that the cutting of the principal chains contributes to atomization of a conductive polymer product which is placed in a pressure vessel to receive the treatment.

What is interesting in the method of the present invention is that conductive polymer products treated by the method exhibit a remarkably enhanced conductivity compared with those before the treatment. Specifically, the resistance of a conductive polymer product after the treatment by the method of the invention is 1/10th or less than 1/10th as large as that of the conductive polymer product before the treatment. It is supposed that the reason that the treatment of a conductive polymer product by contacting it with carbon dioxide in a supercritical state, water and an organic solvent described hereinbefore lowers the resistance of the conductive polymer product is as follows: When a conductive polymer product, such as a Baytron, in the form of fine particles, which has been atomized in an atmosphere of supercritical carbon dioxide, is contacted with a compatible organic solvent, which has been added, and carbon dioxide in a supercritical state with properties of both gas and liquid, the carbon dioxide in the supercritical state and the organic solvent passes through and permeates into the fine particles, and further deep into the fine particles. It is surmised that this deep permeation further enhances the conductivity of conductive polymer products including Baytrons.

We will generally explain the method of this invention, referring to the figures.

FIG. 1 shows a schematic illustration of an apparatus for enhancing conductivity, an example suitable to carry out the present invention. As shown in FIG. 1, the apparatus for enhancing conductivity 1 includes a pressure vessel 2, a carbon dioxide cylinder 3, a water tank 4 and a third valve 5.

The pressure vessel 2 should be a vessel capable of containing a conductive polymer product obtained by polymerizing-3,4-ethylenedioxythiophene in an aqueous solution of polystyrenesulfonic acid; water; an organic solvent compatible with the conductive polymer composition; and carbon dioxide, and capable of bringing carbon dioxide into a supercritical state. The pressure vessel 2 should be equipped with a stirrer 2A for stirring the contents therein. The third manual valve 5 is placed in an exhaust pipe attached to the pressure vessel 2.

Carbon dioxide gas is stored in the carbon dioxide cylinder 3, and is supplied to the pressure vessel 2 from the cylinder. The carbon dioxide cylinder 3 is placed prior to the pressure vessel 2, and communicates with the vessel. Between the carbon dioxide cylinder 3 and the pressure vessel 2, a first pump 3A and a first valve 3B are arranged in this order.

Pure water is stored in the water tank 4 and supplied to the pressure vessel from this tank. The water tank 4 is placed prior to the pressure vessel 2 and communicates with the vessel. Between the water tank 4 and the pressure 2 are arranged a second pump 4A and a second valve 4B in this order.

Figure 2:
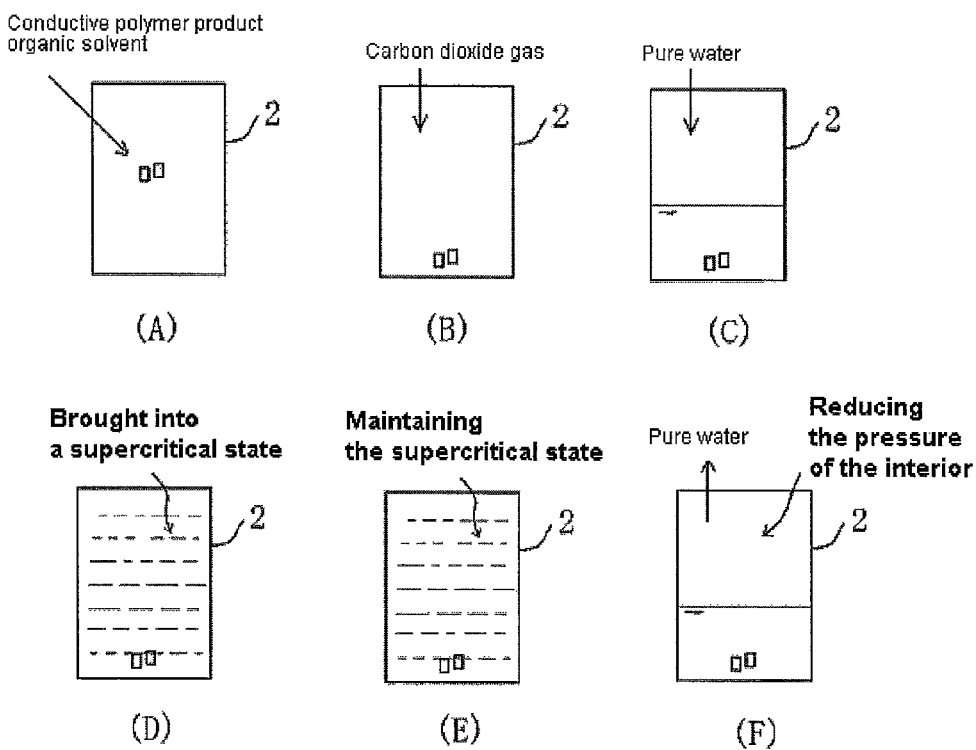
FIG. 2 is a schematic illustration showing the states inside a pressure vessel.

We will explain a method of enhancing conductivity with the apparatus for enhancing conductivity, referring to FIGS. 1 and 2.

First, a predetermined amount of a conductive polymer product and a predetermined amount of an organic solvent are introduced into the pressure vessel 2. (See FIG. 2(a).)

Then, a first pump 3A and the first valve 3B are activated, so that carbon dioxide gas, which will be brought into a supercritical state, is supplied from the carbon dioxide cylinder 3 to the pressure vessel 2. (See FIG. 2(B).)

The second pump 4A and the second valve 4B are also activated, so that pure water is supplied from the water tank 4 to the pressure vessel 2. (See FIG. 2(C).) Either the pure water or the carbon dioxide gas may be supplied earlier than the other, or they may be supplied simultaneously.

Subsequently, the pressure and the temperature inside the pressure vessel 2 are raised, which brings the supplied carbon dioxide gas into a supercritical state. If necessary, additional carbon dioxide gas is forced into the pressure vessel 2. During this stage, the stirrer 2A may be actuated, at the operator's discretion, to stir the carbon dioxide to be or being in a supercritical state and the pure water. (See FIG. 2(D).) Thereafter the carbon dioxide is kept in a supercritical state for a predetermined time period. (See FIG. 2(E).)

The third valve 5 is operated, so that the carbon dioxide in a gaseous state is released from the pressure vessel 2 through the third valve 5 to the atmosphere. The pressure inside the pressure vessel 2 is thus reduced and returned to normal pressure. Water, the organic solvent and the treated conductive polymer product remain in the pressure vessel 2. The resultant conductive polymer product is separated and collected from the mixture of the water, the organic solvent and the treated conductive polymer product in the pressure vessel 2 by a separator.

It is supposed that pure water itself is turned into a state similar to a supercritical state when carbon dioxide gas, which has been mixed with water and a conductive polymer product, is brought into a supercritical state in the way depicted hereinbefore. Reduction in the pressure from a high pressure, which is called for to realize a supercritical state, to normal pressure returns carbon dioxide in a supercritical state to normal carbon dioxide gas.

Other apparatuses for enhancing conductivity with different structures may be used in place of the apparatus for enhancing conductivity 1 shown in FIG. 1. One example is shown in FIG. 3.

Figure 3:
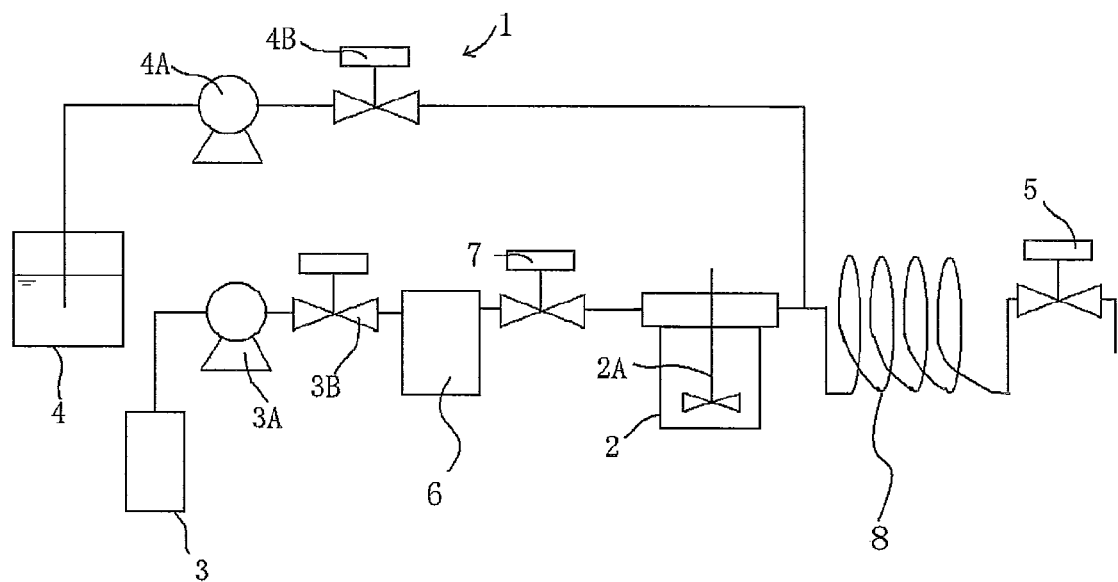
FIG. 3 is a schematic illustration showing another example of the apparatus for enhancing conductivity according to the present invention.

Some of the members and apparatus shown in FIG. 3 are the same as corresponding members and apparatus shown in FIG. 1. The same members and apparatus in FIG. 3 have the same reference numerals as the corresponding ones in FIG. 1. Explanation of those is omitted in the following. The apparatus 1 shown in FIG. 1 is different from the apparatus shown in FIG. 3 in the following respects: A second pressure vessel 6 is placed downstream from the valve 3B, connected to the valve with a pipe. The inside of the second pressure vessel 6 communicates with the first pressure vessel 2 through a pipe provided with a fourth valve 7. A coil reactor 8, which is a tubular reactor wound in the shape of a coil, is placed downstream from the first pressure vessel 2 and connected thereto through a pipe. A pipe branching off from the pipe that connects the first pressure vessel 2 with the coil reactor 8 is connected to a pipe extending from the second valve 4B, so that water stored in the water tank 4 is capable of being supplied to the coil reactor 8.

The operation of the apparatus for enhancing conductivity 1 begins by supplying carbon dioxide gas from the carbon dioxide cylinder 3 to the second pressure vessel 6, and heating the inside of the second pressure vessel 6 to a predetermined temperature so that the carbon dioxide is brought into a supercritical state in the second pressure vessel 6. Meanwhile the first pressure vessel 2 is charged with predetermined amounts of a conductive polymer product and an organic solvent. Then carbon dioxide in a supercritical state supplied from the second pressure vessel 6 is introduced into the first pressure vessel 2, where the conductive polymer product is allowed to contact the supercritical carbon dioxide as well as the organic solvent. Subsequently, a mixture of the supercritical carbon dioxide, the conductive polymer product and the organic solvent is fed to the coil reactor 8, while water in the water tank 4 is supplied via the valve 4B in an open state to the coil reactor 8. The supercritical carbon dioxide, the conductive polymer product, water and the organic solvent in a state of a mixture pass through the coil reactor 8. While they are passing through the coil reactor 8, the atomization and conductivity-enhancement of the conductive polymer are achieved. The length of the coil of the coil reactor 8 and the inner diameter thereof are decided so that the reactor is capable of containing the mixture for a period of time necessary to achieve atomization and conductivity enhancement of the conductive polymer product. Also, the flow rate of the fluid flowing in the coil is decided suitably.

EXAMPLES

The present invention will be described more specifically by means of working examples and comparative examples. The present invention is not limited to the contents of the working examples.

Working Example 1

As shown in FIG. 1, in a pressure vessel 2 whose inner volume was 500 mL were placed 10 mL of a 1 wt % aqueous dispersion of a conductive polymer product (product name: Baytron P) whose average particle size was 0.4 um before the treatment, 10 g of pure water and 1.1 g of DMSO.

The interior of the pressure vessel 2 was heated to 100° C., and 308 g of carbon dioxide gas was forced into the pressure vessel 2 so that the interior had a pressure of 10 MPa. The carbon dioxide gas that had been supplied to the pressure vessel 2 was thus brought into a supercritical state. During this process, the operator actuated a stirrer 2A to stir the carbon dioxide to be or being in the supercritical state and water at his/her discretion. Then, the carbon dioxide fluid in the supercritical state was kept for one hour.

After one hour, the third valve 5 was operated and the pressure inside the pressure vessel 2 was returned to normal pressure. When the interior of the pressure vessel 2 returned to normal pressure, a mixture of water, DMSO and a treated conductive polymer product remained in the vessel 2. The mixture was taken out of the pressure vessel 2. When the mixture was used in the form of an aqueous dispersion, the mixture was not subjected to any further treatment. When the resultant was used in the form of particles, the mixture was subjected to filtration. The treated conductive polymer product was thus collected.

The particle size distribution of the particles of the conductive polymer product before they were placed in the pressure vessel 2 was measured with the particle size distribution analyzer, specifically a device named "Microtrac" produced by Nikkiso Co., Ltd.

The particle size distribution of the particles of the collected conductive polymer product, or that after the treatment, was measured with the particle size distribution analyzer, specifically a device named "Microtrac" produced by Nikkiso Co., Ltd. As a result, the average particle size was 0.05 µm. The particle size of the collected conductive polymer was distributed in a narrow range from 0.02 to 0.05 µm.

The conductivity of the collected conductive polymer product was evaluated. Specifically, the resistance of the product was measured with a surface resistance meter. As a result, the surface resistance was $0.607 \times 10^3 \Omega/\square$. The surface resistance of the conductive polymer product before the treatment was $10^6 \Omega/\square$.

Comparative Example 1

The 1 wt % aqueous dispersion of the conductive polymer product (product name: Baytron P) used in Working Example 1 in an amount of 10 mL and DMSO in an amount of 1.1 g were mixed. The mixture was dried at temperatures from 50 to 100° C. Then a film of the resultant was formed. The conductivity of the resulting conductive polymer product was measured with the same method as in Work Example 1. The surface resistance was $10^4 \Omega/\square$.

As understood from the results of Working Example 1 and Comparative Example 1, the method of enhancing conductivity according to the present invention is capable of dramatically reducing the surface resistance of a treated conductive product. In other words, the method of the present invention is capable of remarkably enhancing the conductivity of a conductive product. Furthermore, the conductive polymer product treated by the method of the present invention is atomized, which improves smoothness of the surface of a film formed from the treated product. The resultant conductive polymer product, with its advantages of the smoothness utilized, may suitably be applied to electrodes of conductive polymer aluminum solid capacitors and organic electroluminescence.

Working Examples 2 and 3

In Working Example 2, the same steps as those of Working Example 1 were carried out, except that 1.03 g of NMP, which stands for N-methylpyrrolidone, was used in place of 1.1 g of DMSO. Also in Working Example 3, the same steps as those of Working Example 1 were carried out, except that 1.11 g of ethylene glycol was used in place of 1.1 g of DMSO.

The results were as follows: The conductivity of the conductive polymer product produced in Working Example 2 where the organic solvent was NMP was evaluated as $0.741 \times 10^3 \Omega/\square$. The conductivity of the conductive polymer product produced in Working Example 3 where the organic solvent was ethylene glycol was evaluated as $0.965 \times 10^3 \Omega/\square$. It can be said that DMSO is preferable as organic solvent based on the results of Working Examples 1, 2 and 3.

Working Example 4

The same steps as those of Working Example 1 were carried out, except that a conductive polymer product whose product name was Baytron PHCV4 was used in place of the conductive polymer product of Baytron P.

The surface resistance of the Baytron PHCV4 conductive polymer product after the treatment was measured with the same method as in Working Example 1. The measured value was 200Ω/□. The surface resistance of the product before the treatment was 0.227×10$^4$Ω/□.

Comparative Example 2

The same steps as those of Comparative Example 1 were carried out, except that a conductive polymer product whose product name was Baytron PHCV4 was used in place of the conductive polymer product of Baytron P.

The surface resistance of the Baytron PHCV4 conductive polymer product after the treatment was measured with the same method as in Working Example 1. The surface resistance was 10$^3$Ω/□.

Working Examples 5 and 6

In Working Example 5, the same steps as those of Working Example 1 were carried out, except that 1.03 g of NMP, which stands for N-methylpyrrolidone, was used in place of 1.1 g of DMSO in Working Example 4. Also in Working Example 6, the same steps as those of Working Example 1 were carried out, except that 1.11 g of ethylene glycol was used in place of 1.1 g of DMSO in Working Example 4.

The results were as follows: The conductivity of the conductive polymer product produced in Working Example 5 where the organic solvent was NMP was evaluated as 0.830× 10$^3$Ω/□. The conductivity, or the surface resistance, of the conductive polymer product produced in Working Example 6 where the organic solvent was ethylene glycol was evaluated as 1.093×10$^3$Ω/□. It can be said that DMSO is preferable as organic solvent based on the results of Working Examples 4, 5 and 6.

Working Examples 7-9

In Working Example 7, the same steps as those of Working Example 1 were carried out, except that 10 mL of a 8 wt % aqueous dispersion of polyaniline was used in place of 10 mL of the 1 wt % dispersion of the conductive polymer product (product name: Baytron P). In Working Examples 8 and 9, the same steps as those of Working Examples 2 and 3 were respectively carried out, with the same change as in Working Example 7.

The results were as follows: The conductivity of the conductive polymer product produced in Working Example 7 where the organic solvent was DMSO was evaluated as 0.363×10$^3$Ω/□. The conductivity of the conductive polymer product produced in Working Example 8 where the organic solvent was NMP was 0.988×10$^3$Ω/□. The conductivity of the conductive polymer product produced in Working Example 9 where the organic solvent was ethylene glycol was evaluated as 1.147×10$^3$Ω/□.

It can be said that DMSO is preferable as organic solvent. It was also proven that the method using polyaniline is also capable of enhancing conductivity.

We claim:

1. A method of enhancing an electrical conductivity of an electrically conductive polymer product comprising: placing an electrically conductive polymer product, water, an organic solvent compatible with the electrically conductive polymer product, and carbon dioxide gas in a pressure vessel; and applying heat and pressure to an interior of the pressure vessel to bring the carbon dioxide into a supercritical state.

2. The method of enhancing a conductivity of a conductive polymer product according to claim 1, wherein the conductive polymer product is a product obtained by polymerizing 3,4-ethylenedioxythiophene in an aqueous solution of polystyrenesulfonic acid and/or polyaniline.

3. The method of enhancing a conductivity of a conductive polymer product according to claim 1, wherein the organic solvent is at least one selected from the group consisting of dimethyl sulfoxide, ethylene glycol, N-methylpyrrolidone and N,N-dimethylformamide.

4. The method of enhancing a conductivity of a conductive polymer product according to claim 1, wherein the interior of the pressure vessel is pressurized to a pressure from 7 to 25 MPa and heated to a temperature from 85 to 110° C., and the pressure and the temperature are maintained for 0.5 to 4 hours.

5. The method of enhancing a conductivity of a conductive polymer product according to claim 2, wherein the organic solvent is at least one selected from the group consisting of dimethyl sulfoxide, ethylene glycol, N-methylpyrrolidone and N,N-dimethylformamide.

6. The method of enhancing a conductivity of a conductive polymer product according to claim 2, wherein the interior of the pressure vessel is pressurized to a pressure from 7 to 25 MPa and heated to a temperature from 85 to 110° C., and the pressure and the temperature are maintained for 0.5 to 4 hours.

7. The method of enhancing a conductivity of a conductive polymer product according to claim 3, wherein the interior of the pressure vessel is pressurized to a pressure from 7 to 25 MPa and heated to a temperature from 85 to 110° C., and the pressure and the temperature are maintained for 0.5 to 4 hours.

8. The method of enhancing a conductivity of a conductive polymer product according to claim 5, wherein the interior of the pressure vessel is pressurized to a pressure from 7 to 25 MPa and heated to a temperature from 85 to 110° C., and the pressure and the temperature are maintained for 0.5 to 4 hours.

* * * * *